US010075962B2

(12) United States Patent
Gresset (10) Patent No.: US 10,075,962 B2
(45) Date of Patent: Sep. 11, 2018

(54) METHOD AND PROCESSING DEVICE FOR DETERMINING TRANSMISSION CHANNEL RESOURCES TO BE ALLOCATED FOR A COMMUNICATION (71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 121 days.

(21) Appl. No.: 15/028,916

(22) PCT Filed: Oct. 20, 2014

(86) PCT No.: PCT/JP2014/078423
§ 371 (c)(1),
(2) Date: Apr. 12, 2016

(87) PCT Pub. No.: WO2015/060452
PCT Pub. Date: Apr. 30, 2015

(65) Prior Publication Data
US 2016/0262164 A1   Sep. 8, 2016

(30) Foreign Application Priority Data
Oct. 23, 2013  (EP) .................................... 13189952

(51) Int. Cl.
*H04W 72/08* (2009.01)
*H04W 72/04* (2009.01)
*H04B 17/345* (2015.01)

(52) U.S. Cl.
CPC ..... *H04W 72/082* (2013.01); *H04W 72/0453* (2013.01); *H04W 72/087* (2013.01); *H04B 17/345* (2015.01)

(58) Field of Classification Search
None
See application file for complete search history.

(56) References Cited

U.S. PATENT DOCUMENTS

| 2010/0216477 A1* | 8/2010 | Ryan | H04W 16/04 455/449 |
|---|---|---|---|
| 2013/0252558 A1* | 9/2013 | Nieto | H04W 72/08 455/73 |
| 2015/0237637 A1* | 8/2015 | Venkatraman | H04W 72/082 370/329 |

FOREIGN PATENT DOCUMENTS

EP    2 557 876 A1    2/2013

OTHER PUBLICATIONS

3GPP TSG RAN WG1 meeting #61bis, R1-103900, Dresden, Germany, Jun. 28-Jul. 2, 2010, 6.8.2, Huawei, Enhanced ICIC and Resource-Specific CQI Measurement, Discussion and Decision.

* cited by examiner

*Primary Examiner* — Diane Lo
(74) *Attorney, Agent, or Firm* — Birch, Stewart, Kolasch & Birch, LLP (57) ABSTRACT For determining transmission channel resources to be allocated for a communication, a processing device: obtains an interference profile representative of interference with said communication implied by at least one predicted interferer; determines, for each set of transmission channel resources made available to perform said communication, a first figure of merit representative of robustness to frequency-selective interference with said communication that might be implied by unpredicted interferers; determines from the interference profile, for each set of transmission channel resources made available to perform said communication, a second figure of merit representative of robustness to frequency-selective interference with said communication that is expected to be implied by predicted interferers; and selects transmission channel resources that optimize the first figure of merit under a QoS-target constraint applied to the second figure of merit.

14 Claims, 4 Drawing Sheets

METHOD AND PROCESSING DEVICE FOR DETERMINING TRANSMISSION CHANNEL RESOURCES TO BE ALLOCATED FOR A COMMUNICATION

The present invention generally relates to determining transmission channel resources to be allocated for communications from a first communication device to a second communication device, interferers implying frequency-selective interference with said communications. In particular, the present invention relates to determining transmission channel resources to be allocated for communications between an access point of a wireless telecommunications network and a communication device located in a moving conveyance moving on a path, interferers implying frequency-selective interference with said communications.

In wireless communications, transmission channel resources are usually defined as parameters of a multiple access transmission technology that allows several devices to transmit on a same frequency channel in a same time frame, where the time domain is sequentially divided into time frames. For example, in TDMA (Time Division Multiple Access), the transmission channel resources are periods of time in a time frame; in FDMA (Frequency Division Multiple Access), the transmission channel resources are sub-parts of the frequency spectrum used for communication over the whole time frame; and, in CDMA (Code Division Multiple Access), the transmission channel resources are spreading codes used during the whole time frame. Also, several multiple access technologies can be used at the same time.

An interference received at a given receiver device is defined as the signal transmitted by one or several source devices to one or several other receiver devices on same transmission channel resources as the ones used by a source device for transmitting data to said given receiver device.

In an illustrative situation, access points (APs) of a wireless telecommunications system are deployed along a path over which a moving conveyance moves in order to offer wireless communications services to communication devices located in the moving conveyance. For instance, the moving conveyance is a train and the path is a railroad. The APs can be connected to a server implemented in a core network or be directly connected one with each other in order to respectively implement centralized or decentralized transmission channel resources management and/or mobility management functionalities. When the moving conveyance moves along the path, the considered communication devices located in the moving conveyance are assumed to communicate with the AP providing the most robust data link through hand-over procedures. Such communications with the APs use transmission channel resources typically allocated by the APs or the aforementioned server.

Usually, such transmission channel resources correspond to a channel in the ISM (Industrial, Scientific and Medical) radio band, which implies that neighbouring devices are also using same transmission channel resources with a high probability. Therefore, many communications may occur concurrently in an unlicensed spectrum, which generate interference that may be damageable for successfully performing the communications.

It is therefore desirable to determine transmission channel resources to be allocated for communications from a first communication device to a second communication device, interferers implying frequency-selective interference with said communications, in order to improve said communications.

In particular, it is desirable to determine transmission channel resources to be allocated for communications between an access point of a wireless telecommunications network and a communication device located in a moving conveyance moving on a path, interferers implying frequency-selective interference with said communications, in order to improve said communications.

To that end, the present invention concerns a method for determining transmission channel resources to be allocated for a communication between a first communication device and a second communication device. The method is such that a processing device performs: obtaining an interference profile representative of interference with said communication implied by at least one predicted interferer, each predicted interferer being a device implying frequency-selective interference that has been detected beforehand; determining, for each set of transmission channel resources made available to perform said communication, a first figure of merit representative of robustness to frequency-selective interference with said communication that might be implied by unpredicted interferers, knowing beforehand to what extent said interference might impact said communication; determining from the interference profile, for each set of transmission channel resources made available to perform said communication, a second figure of merit representative of robustness to frequency-selective interference with said communication that is expected to be implied by predicted interferers; and selecting transmission channel resources that optimize the first figure of merit under a QoS-target constraint applied to the second figure of merit, the selected transmission channel resources being then the transmission channel resources to be allocated for the communication between the first communication device and the second communication device. Thus, the robustness to frequency-selective interference implied by unpredicted interferers is improved and therefore the performance of the communication between the first communication device and the second communication device is improved.

According to a particular feature, a frequency spectrum that can be used for performing said communication being divided into frequency bands having each a width equal to a predefined frequency band width covered by interference implied by said unpredicted interferers, the first figure of merit takes into account a quantity of distinct frequency bands among said frequency bands effectively used by said set of transmission channel resources. Thus, said communication is more likely to be successful, when the allocated set of transmission channel resources includes transmission channel resources that are in distinct frequency bands having such a width.

According to a particular feature, the first figure of merit takes into account a minimum frequency distance between each transmission channel resource of said set of transmission channel resources and any other transmission channel resource of said set of transmission channel resources. Thus, said communication is more likely to be successful when the allocated set of transmission channel resources consists of transmission channel resources that are at least separated from each others by a frequency distance that equals or is greater than a predefined frequency band width covered by interference implied by said unpredicted interferers.

According to a particular feature, the first figure of merit takes into account an average frequency distance between successive transmission channel resources of said set of transmission channel resources, when ordering the transmission channel resources of said set of transmission channel resources according to frequency. Thus, said communication is more likely to be successful when the average frequency distance between successive transmission channel resources (ordered according to frequency) of the allocated set of transmission channel resources equals or is greater than a predefined frequency band width covered by interference implied by said unpredicted interferers.

According to a particular feature, a frequency spectrum that can be used for performing said communication being divided into frequency bands having each a width equal to a predefined frequency band width covered by interference implied by said unpredicted interferers, the first figure of merit takes into account a distribution among said frequency bands for said communication, when said communication requires more transmission channel resources than the quantity of frequency bands constituting the frequency spectrum. Thus, said communication is more likely to be successful when the allocated set of transmission channel resources is evenly distributed over said frequency bands.

According to a particular feature, the first figure of merit takes into account a minimum time distance between each couple of transmission channel resources of said set of transmission channel resources which use a same frequency. Thus, said communication is more likely to be successful when the allocated set of transmission channel resources are at least separated from each others by a time distance that equals or is greater than a predefined maximum time period of interference with the unpredicted interferers (e.g. maximum transmission burst time period implemented by said unpredicted interferers).

According to a particular feature, the first figure of merit takes into account a usage ratio of each frequency present in said set of transmission channel resources. Thus, regulations imposing that cumulated wireless transmission power per frequency in use be limited can be met.

According to a particular feature, each transmission channel resource being used to perform one transmission among plural transmissions constituting said communication, each said transmission being a transmission of one copy of a same data set, the second figure of merit is a sum of a third figure merit determined for each transmission channel resource of said set of transmission channel resources, the third figure of merit being representative of a probability of success of one said transmission via said transmission channel resource. Thus, determining the second figure of merit is simple.

According to a particular feature, each transmission channel resource being used to perform a transmission of a distinct segment of a data set after encoding with redundancy data, the second figure of merit is a sum of a fourth figure merit determined for each transmission channel resource of said set of transmission channel resources, the fourth figure of merit being representative of a channel capacity enabled by said transmission channel resource. Thus, determining the second figure of merit is simple.

According to a particular feature, when implementing an error correcting code converting information bits into coded bits which are then converted into symbols of a discrete modulation before transmission in the scope of said communication, the second figure of merit is representative of a transmission performance via said set of transmission channel resources by taking into account signal-plus-interference to noise ratio information resulting from the interference profile for each transmission channel resource of said set of transmission channel resources. Thus, determining the second figure of merit is simple.

According to a particular feature, the processing device performs: dividing into groups the transmission channel resources made available to perform said communication; determining another figure of merit for each transmission channel resource of each group; associating with each group said another figure of merit that is representative of the best performance among said another figures of merit determined for the transmission channel resources of said group; and considering the sets of transmission channel resources made available to perform said communication as being aggregations of groups among said groups. Furthermore, the second figure of merit is determined, for each set of transmission channel resources made available to perform said communication, as being the sum of said another figure of merit associated with each group forming said set of transmission channel resources. Thus, determining the second figure of merit is cost-effective in terms of processing resources and processing latency.

According to a particular feature, when the second figure of merit for any one of the sets of transmission channel resources made available to perform said communication shows that the QoS-target constraint cannot be met, the processing device selects the set of transmission channel resources to be allocated to said communication which optimizes the second figure of merit and otherwise selects the set of transmission channel resources to be allocated to said communication for which the first figure of merit is optimized, and for which, for identical values of the first figure of merit, the second figure of merit is optimized. Thus, optimizing the first figure of merit under a QoS-target constraint applied to the second figure of merit is implemented in a simple manner.

According to a particular feature, for selecting the transmission channel resources that optimize the first figure of merit under a QoS-target constraint applied to the second figure of merit, the processing device determines, for each set of transmission channel resources made available to perform said communication, a fifth figure of merit combining the first and second figures of merit such that a penalty or barrier function is applied to a difference between the second figure of merit and the QoS-target constraint. Thus, optimizing the first figure of merit under a QoS-target constraint applied to the second figure of merit is alternatively implemented in a simple manner.

According to a particular feature, when the second figure of merit for any one of the sets of transmission channel resources made available to perform said communication shows that the QoS-target constraint cannot be met, the processing device selects the set of transmission channel resources to be allocated to said communication which optimizes the second figure of merit and otherwise selects the set of transmission channel resources to be allocated to said communication which optimizes the first figure of merit. Thus, optimizing the first figure of merit under a QoS-target constraint applied to the second figure of merit is yet alternatively implemented in a simple manner.

According to a particular feature, said communication being a communication between a communication device located in a moving conveyance performing a current journey on a path and an access point of a wireless telecommunications network located along the path, the interference profile is built from a first interference profile and/or a second interference profile, the first interference profile depending at least on interference measurements or estimations performed relatively to at least one communication device located in the moving conveyance or another moving conveyance during at least one preceding journey on the path, the second interference profile depending at least on interference measurements or estimations performed relatively to at least one communication device located in the moving conveyance during the current journey on the path. Thus, communications between the access point and the communication device located in the moving conveyance are efficiently improved.

The present invention also concerns a processing device for determining transmission channel resources to be allocated for a communication between a first communication device and a second communication device. The processing device comprises: means for obtaining an interference profile representative of interference with said communication implied by at least one predicted interferer, each predicted interferer being a device implying frequency-selective interference that has been detected beforehand; means for determining, for each set of transmission channel resources made available to perform said communication, a first figure of merit representative of robustness to frequency-selective interference with said communication that might be implied by unpredicted interferers, knowing beforehand to what extent said interference might impact said communication; means for determining from the interference profile, for each set of transmission channel resources made available to perform said communication, a second figure of merit representative of robustness to frequency-selective interference with said communication that is expected to be implied by predicted interferers; and means for selecting transmission channel resources that optimize the first figure of merit under a QoS-target constraint applied to the second figure of merit, the selected transmission channel resources being then the transmission channel resources to be allocated for the communication between the first communication device and the second communication device.

The present invention also concerns a computer program that can be downloaded from a communication network and/or stored on a medium that can be read by a processing device. This computer program comprises instructions for causing implementation of the aforementioned method, when said program is run by the processing device. The present invention also concerns information storage means, storing a computer program comprising a set of instructions causing implementation of the aforementioned method, when the stored information is read from said information storage means and run by the processing device.

Since the features and advantages related to the processing device and to the computer program are identical to those already mentioned with regard to the corresponding aforementioned method, they are not repeated here.

The characteristics of the invention will emerge more clearly from a reading of the following description of an example of embodiment, said description being produced with reference to the accompanying drawings, among which.

In order to increase performance of communications between a first communication device and a second communication device, interferers implying frequency-selective interference with said communications, it is proposed that a processing device performs: obtaining an interference profile representative of interference with said communication implied by at least one predicted interferer, each predicted interferer being a device implying frequency-selective interference that has been detected beforehand; determining, for each set of transmission channel resources made available to perform said communication, a first figure of merit representative of robustness to frequency-selective interference with said communication that might be implied by unpredicted interferers; determining from the interference profile, for each set of transmission channel resources made available to perform said communication, a second figure of merit representative of robustness to frequency-selective interference with said communication that is expected to be implied by predicted interferers; and selecting transmission channel resources that optimize the first figure of merit under a QoS-target constraint applied to the second figure of merit, the selected transmission channel resources being then the transmission channel resources to be allocated for the communication between the first communication device and the second communication device. It means that the optimization is not performed with regard to the best achievement of the QoS target in view of already known (predicted) interference, but the optimization is performed regarding robustness to unpredicted interferers, while ensuring that the QoS target be achieved regarding the already known (predicted) interference. For the unpredicted interferers, what is known a priori is to what extent the resulting interference impacts the communication in the worst case.

The detailed description hereafter illustratively deals with a wireless telecommunications system in which communications have to be performed between APs located along a path of a moving conveyance and at least one communication device located inside the moving conveyance. It has to be understood that the same principles apply in a more general context of communications between a first communication device and a second communication device, interferers implying frequency-selective interference with said communications.

Figure 1:
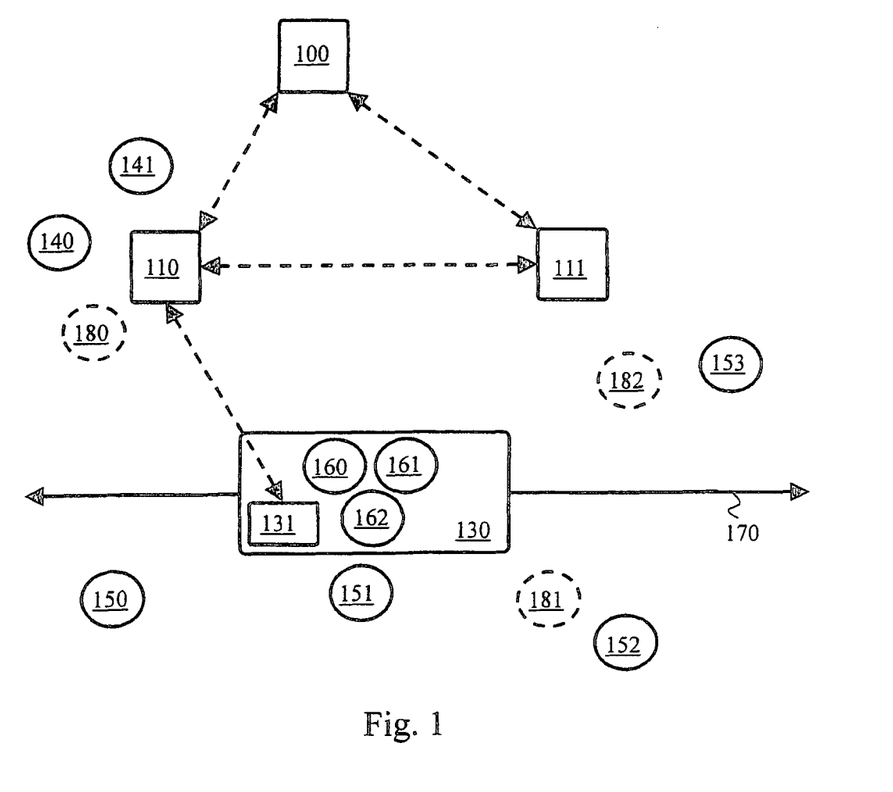
FIG. 1 schematically represents a wireless telecommunications system in which the present invention may be implemented.

FIG. 1 schematically represents a wireless telecommunications system in which the present invention may be implemented.

The wireless telecommunications system comprises APs 110, 111 located along a path 170 of a moving conveyance 130. The moving conveyance 130 is for instance a train and the path is a railroad guiding the train from a departure station to an arrival station. According to another example, the moving conveyance 130 is a bus and the path is a predefined route followed by the bus.

The APs 110, 111 offer services of the wireless telecommunications system to communication devices, such as the communication device 131 located in the moving conveyance 130. The communication device 131 is for instance a mobile terminal or a relay station allowing mobile terminals located in the moving conveyance to access the services of the wireless telecommunications system via the APs.

The wireless telecommunications system may further comprise a server 100, for instance implemented in a core network implementing centralized radio resources management and/or mobility management functionalities.

The APs 110, 111 may be interconnected one with each other, thus implementing decentralized radio resources management and/or mobility management functionalities.

Static interferers 150, 151, 152, 153 may be located sufficiently close to the path 170 of the moving conveyance 130 to impact the downlink communications from the APs 110, 111 to the communication device 131 located in the moving conveyance 130. Such interferers 150, 151, 152, 153 are for instance WiFi (registered trademark) access points, conforming to the IEEE 802.11 standards. Such static interferers 150, 151, 152, 153 may also be microwave ovens installed in premises or places located along the path 170.

Other static interferers 140, 141 may be located sufficiently close to the AP 110 to impact the uplink communications from the communication device 131 located in the moving conveyance to the AP 110. Such interferers 140, 141 are for instance WiFi (registered trademark) access points, conforming to the IEEE 802.11 standards. Such other static interferers 140, 141 may also be microwave ovens installed in premises or places located near the AP 110.

On-board interferers 160, 161, 162 may be located inside the moving conveyance 130 and therefore move with said moving conveyance. These interferers 160, 161, 162 impact the downlink communications from the APs, 110, 111 to the communication device 131 located in the moving conveyance 130 and/or the uplink communications from the communication device 131 in the moving conveyance 130 to the APs 110, 111. Such interferers are for instance Bluetooth (registered trademark) devices, conforming to the IEEE 802.15.1 standards, or Zigbee (registered trademark) devices, conforming to the IEEE 802.15.4 standards.

Further interferers 180, 181, 182 may be located sufficiently close to the path 170 of the moving conveyance 130 to impact the downlink communications from the APs 110, 111 to the communication device 131 located in the moving conveyance 130 and/or the uplink communications from the communication device 131 in the moving conveyance 130 to the APs 110, 111. The interferers 180, 181, 182 may be static or moving, but their essential characteristics with regard to interference management are such that, contrary to the static interferers 140, 141, 150, 151, 152, 153, and to the on-board interferers 160, 161, 162, the effective presence of the interferers 180, 181, 182 cannot be predicted.

The static interferers 150, 151, 152, 153 and/or the static interferers 140, 141 and/or the on-board interferers 160, 161, 162, according to whichever interferers are effectively present, are herein referred to as predicted interferers, whereas the interferers 180, 181, 182 are herein referred to as unpredicted interferers.

A processing device is in charge of determining the appropriate transmission channel resources allocation for the downlink communications from the APs 110, 111 to the communication device 131 located in the moving conveyance 130 and/or for the uplink communications from the communication device 131 located in the moving conveyance 130 to the APs 110, 111.

As will be detailed hereafter with regard to FIGS. 4A to 4G, the processing device can be located in, or connected to, the server 100, the APs 110, 111, or the communication device 131.

In a more general approach, considering communications between a first communication device and a second communication device, the processing device is in charge of determining the appropriate transmission channel resources allocation for said communications. The processing device can be located in, or connected to, the first communication device or the second communication device.

Figure 2:
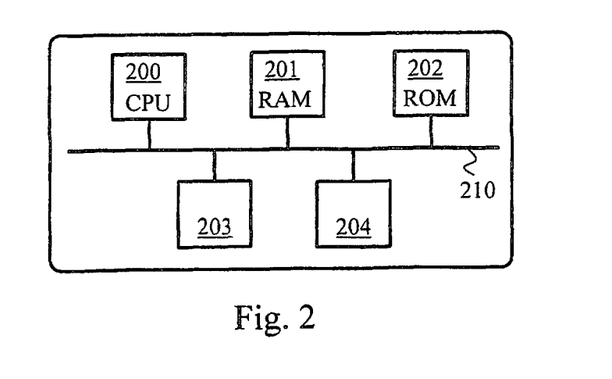
FIG. 2 schematically represents an architecture of a processing device of the wireless telecommunications system.

FIG. 2 schematically represents an architecture of the processing device. According to the shown architecture, the processing device comprises the following components interconnected by a communications bus 210: a processor, microprocessor, microcontroller or CPU (Central Processing Unit) 200; a RAM (Random-Access Memory) 201; a ROM (Read-Only Memory) 202; an HDD (Hard-Disk Drive) or an SD (Secure Digital) card reader 203, or any other device adapted to read information stored on storage means; and at least one communication interface 204.

The communication interface 204 allows the processing device to communicate with the communication device 131 located in the moving conveyance 130 and/or with the APs 110, 111 and/or with the server 100.

CPU 200 is capable of executing instructions loaded into RAM 201 from ROM 202 or from an external memory, such as the HDD or an SD card via the SD card reader 203. After the processing device has been powered on, CPU 200 is capable of reading instructions from RAM 201 and executing these instructions. The instructions form one computer program that causes CPU 200 to perform some or all of the steps of the algorithm described hereafter with regard to FIG. 3.

Figure 3:
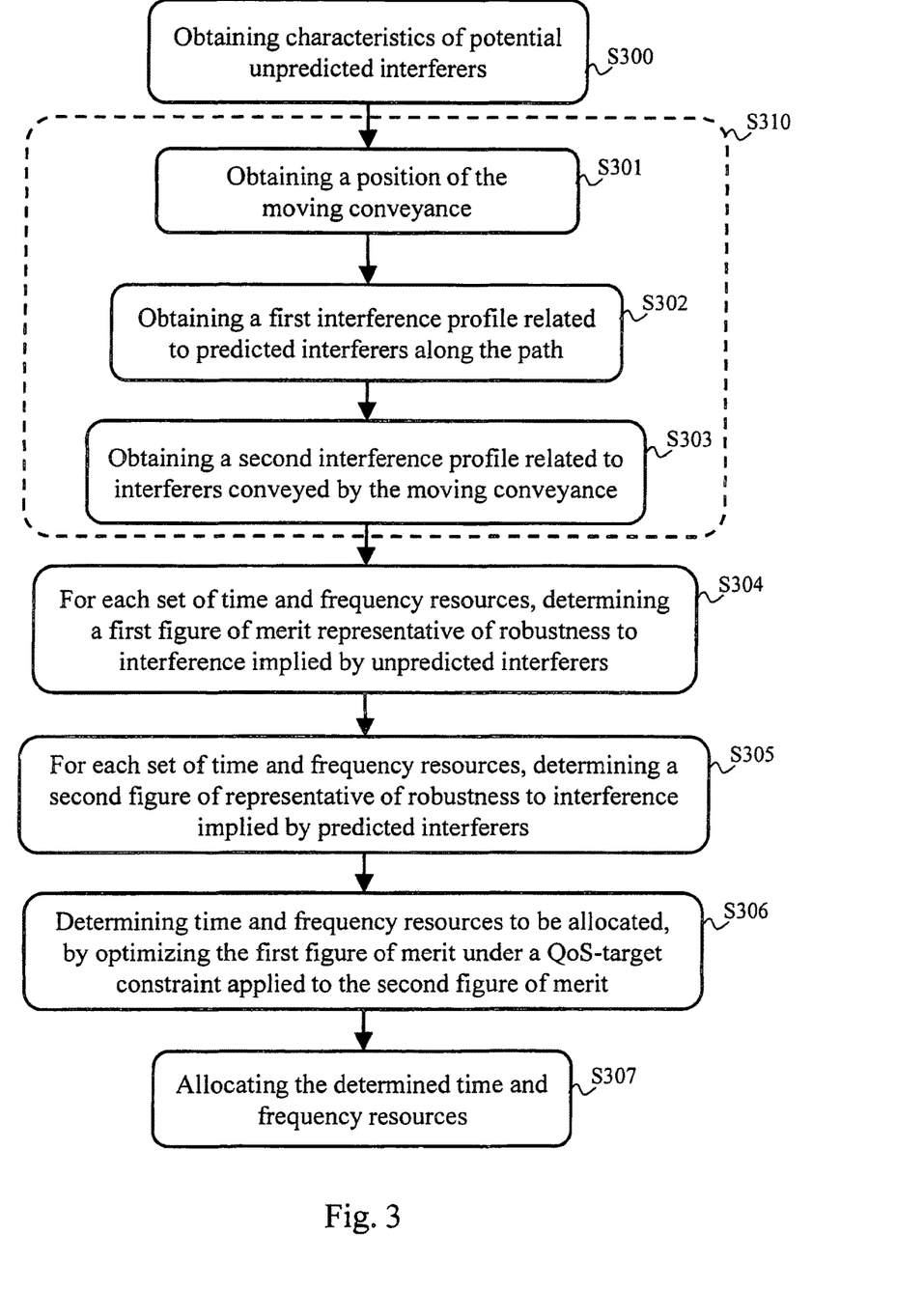
FIG. 3 schematically represents an algorithm for determining transmission channel resources to be allocated for communications from a first communication device to a second communication device.

Any and all steps of the algorithm described hereafter with regard to FIG. 3 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 schematically represents an algorithm for determining resources to be allocated for communications between a first communication device and a second communication device, interferers implying frequency-selective interference with said communications. The algorithm of FIG. 3 is more particularly described regarding communications between at least one of the APs 110, 111 and the communication device 131 located in the moving conveyance 130.

The algorithm of FIG. 3 is performed by the processing device. The purpose of the algorithm of FIG. 3 is to allocate a sequence S of transmission channel resources for performing a quantity T of transmissions for a data set D (e.g. a data packet).

In a step S300, the processing device obtains characteristics of unpredicted interferers that may be encountered by the communications between the first communication device and the second communication device. In the scope of the wireless telecommunications system of FIG. 1, the processing device obtains characteristics of unpredicted interferers that may be encountered by the communication device 131 when the moving conveyance 130 moves along the path 170. Microwave ovens sporadically activated may be such unpredicted interferers, as microwave ovens operate by emitting a very high power signal over 10 MHz to 20 MHz in the 2.4 GHz frequency band. Nomad devices joining an IEEE 802.11g hotspot may also imply interference by emitting signals in 20 MHz-wide in the 2.4 GHz frequency band. Such characteristics of unpredicted interferers obtained in the step S301 define in what extent the resulting interference impacts in the worst case, the communication between the first and second communication devices.

In a following step S310, the processing device obtains an interference profile representative of interference on said communication implied by at least one predicted interferer. Each predicted interferer is a device implying interference that has been detected beforehand, for instance during an interference learning phase aiming at determining via long-term interference measurements between the first and second communication devices interference that is expected to be implied by said predicted interferer vis-à-vis said communication.

In the particular illustrative example of the wireless telecommunications system of FIG. 1, the step S310 may be decomposed into steps S301, S302 and S303.

In the step S301, the processing device obtains a position of the moving conveyance 130 along the path 170. The position may be expressed as an absolute value in a geographical coordinate system, or as a relative value with respect to fixed reference points, such as with respect to the respective positions of the APs 110, 111.

According to a first example, the position is obtained from GPS (Global Positioning System) information provided by the a GPS receiver associated with the communication device 131 and transmitted by the communication device 131 toward the processing device.

According to a second example, the position is obtained from received signal power information determined by the communication device 131 from signals received from the APs 110, 111. Knowing the position of the APs 110, 111, and knowing the path 170 followed by the moving conveyance 130, allows determining the position of the communication device 131 from measurements of power of the signals received by the communication device 131 from the APs 110, 111. Each received signal power information is transmitted by the communication device 131 toward the processing device.

According to a third example, the position is obtained from received signal power information determined by the APs 110, 111, from signals received from the communication device 131. Knowing the position of the APs 110, 111, and knowing the path 170 followed by the moving conveyance 130, allows determining the position of the communication device 131 from measurements of power of the signals received by the APs 110, 111 from the communication device 131. The received signal power information is transmitted by the APs 110, 111 toward the processing device.

According to a fourth example, the position is obtained thanks to sensors placed along the path of the moving conveyance and adapted to detect that the moving conveyance 130 goes through. Notifications of such detection are transmitted by the sensors toward the processing device.

Moreover, a position may correspond to a segment of the path 170. Plural effective consecutive positions on the path 170 may then be associated with a single position for the purpose of the invention.

In the step S302, the processing device obtains a first interference profile related to static interferers that have been detected beforehand. When said static interferers are the static interferers 150, 151, 152, 153 located along the path 170 of the moving conveyance 130, the first interference profile applies to downlink communications from the APs 110, 111 to the communication device 131 located in the moving conveyance 130. When said static interferers are the static interferers 140, 141, the first interference profile applies to uplink communications from the communication device 131 located in the moving conveyance 130 to the APs 110, 111.

The first interference profile depends on the position of the moving conveyance 130 on the path 170. Indeed, as the interferers 150, 151, 152, 153 are static, their possible impact on the downlink communications evolve with the position of the moving conveyance 130. Moreover, as the interferers 140, 141 are also static, their possible impact on the uplink communications evolve with the position of the moving conveyance 130. Microwave ovens frequently activated in premises or places along the path 170 may be considered as static interferers. IEEE 802.11g compatible hotspot access points may also be considered as such static interferers.

An interference profile is a collection of data that allows characterizing the interference, as perceived by the communication device 131. For example, the interference profile is an interference level received on transmission channel resources and averaged over several time frames, or a power distribution on transmission channel resources, or a transmission channel resources usage distribution defined as the probability to observe interference in the next time frames knowing a current interference status.

The first interference profile can be obtained from measurements available at the communication device 131. For example, the measurements are the received signal power on a given transmission channel resource and averaged over time, or the averaged frame error rate from which a signal-to-interference-plus-noise ratio (SINR) can be deduced, hence an interference level. Also, if the previous information cannot be given to the processing device, one can rely on statistics of acknowledgement signals when ACK/NACK mechanisms are implemented in the communication protocol.

In one embodiment, the processing device determines the first interference profile from a fingerprint map of interference stored in a database, the fingerprint map of interference providing expected interference levels and is built from the interference observed during preceding journeys of the moving conveyance 130, or other moving conveyances, on the path 170 for downlink communications and from interference observed on a long-term basis by each AP 110, 111 for uplink communications. For instance, the fingerprint map of interference, and therefore the first interference profile, is initially built from information on interference observed during preceding journeys of the moving conveyance 130, or other moving conveyances, on the path 170 without presence of any interferer inside the concerned moving conveyance or with presence of at least one interferer for which the implied interference is a priori known.

As detailed hereafter with regard to FIGS. 4A to 4G, the database storing the fingerprint map of interference can be located in, or connected to, the server 100, or the APs 110, 111, or the communication device 131. The database storing the fingerprint map of interference can be implemented in a different location than the processing device, the device in which the database is implemented hence providing the contents of the database to the processing device.

In the step S303, the processing device obtains a second interference profile related to the interferers 160, 161, 162 located inside the moving conveyance 130. The second interference profile is initially built from information on interference observed during the current journey of the moving conveyance 130 on the path 170 without presence of any interferer located along the path 170 at the position where said interference is observed or with presence of at least one interferer for which the implied interference is a priori known.

Therefore, in at least one embodiment, the first interference profile depends at least on interference measurements or estimations performed relatively to at least one communication device located in the moving conveyance 130 or another moving conveyance during at least one preceding journey on the path 170, and the second interference profile depends at least on interference measurements or estimations performed relatively to at least one communication device located in the moving conveyance 130 during the current journey on the path 170.

In at least one embodiment, the processing device combines the first and second interference profiles in order to build a single interference profile that is used as output of the step S310.

In at least one embodiment, the processing device only considers the first interference profile, e.g. when no predicted interferers are present inside the moving conveyance 130. The first interference profile is thus used as output of the step S310.

In at least one embodiment, the processing device only considers the second interference profile, e.g. when no predicted interferers are present along the path 170 via which the moving conveyance 130 travels. The second interference profile is thus used as output of the step S310.

In a following step S304, the processing device determines, for each set $S_i$ of transmission channel resources made available to perform said T transmissions, a first figure of merit $f(S_i)$ representative of robustness to interference that might be implied by unpredicted interferers. Determining the first figure of merit $f(S_i)$ is performed as a function of the unpredicted interferers characteristics obtained in the step S300. In a variant, the step S300 is not performed and the unpredicted interferers characteristics are already taken into account in the definition of the first figure of merit $f(S_i)$, i.e. already taken into account in the way the first figure of merit $f(S_i)$ is computed.

According to a first embodiment, the unpredicted interferers characteristics obtained in the step S301 include a predefined frequency band width W covered by interference implied by said unpredicted interferers. For instance, when the unpredicted interferers are compliant with IEEE 802.11g, the frequency band width W equals to 20 MHz, which is the frequency width of each channel defined by the IEEE 802.11g specifications. The frequency spectrum that can be used for performing the T transmissions is then divided into frequency bands having a width equal to W. The first figure of merit $f(S_i)$ takes into account a quantity of distinct frequency bands among said frequency bands effectively used by the set $S_i$ of transmission channel resources. In other words, the transmission of the data set D is more likely to be successful, when the set S of transmission channel resources effectively allocated includes transmission channel resources that are in distinct frequency bands having a width that equals or is greater than W.

According to a second embodiment, the first figure of merit $f(S_i)$ takes into account a minimum frequency distance between each transmission channel resource of the set $S_i$ and any other transmission channel resource of the set $S_i$. In other words, the transmission of the data set D is more likely to be successful, when the set S of transmission channel resources effectively allocated consists of transmission channel resources that are at least separated from each others by a frequency distance that equals or is greater than W.

According to a third embodiment, the unpredicted interferers characteristics obtained in the step S301 include the predefined frequency band width W covered by interference implied by said unpredicted interferers. When ordering the transmission channel resources of the set $S_i$ according to frequency, the first figure of merit $f(S_i)$ takes into account an average frequency distance between successive transmission channel resources of the set $S_i$. In other words, the transmission of the data set D is more likely to be successful, when the average frequency distance between successive transmission channel resources (ordered according to frequency) of the set S of transmission channel resources effectively allocated equals or is greater than W.

According to a fourth embodiment, the unpredicted interferers characteristics obtained in the step S301 include the predefined frequency band width W covered by interference implied by said unpredicted interferers. The frequency spectrum that can be used for performing the T transmissions is then divided into frequency bands having a width equal to W. The first figure of merit $f(S_i)$ takes into account a distribution of the T transmissions among said frequency bands, when the T transmissions require more transmission channel resources than the quantity of frequency bands constituting said frequency spectrum. For instance, the first figure of merit $f(S_i)$ is expressed as follows:

$$f(S_i) = \prod_p (1 + N_p)$$

wherein $N_p$ represents the quantity of transmissions occurring in the frequency band identified by the index p. Optimizing the first figure of merit $f(S_i)$ therefore targets evenly distributing the T transmissions over said frequency bands.

According to a fifth embodiment, the first figure of merit $f(S_i)$ takes into account a minimum time distance between each couple of transmission channel resources of the set $S_i$ which use a same frequency. In other words, the transmission of the data set D is more likely to be successful, when the set $S_i$ of transmission channel resources includes time slots, for a given frequency, that are at least separated from each others by a time distance that equals or is greater than a predefined maximum time period B of interference with the unpredicted interferers. Said predefined period B is equal to the maximum burst time period expected from said unpredicted interferers. For instance, when the unpredicted interferers are compliant with IEEE 802.11g and if it is considered that burst transmissions according to the IEEE 802.11g specifications do not exceed 20 milliseconds, B is defined with a value of 20 milliseconds. Said predefined period B is, in a variant related to the wireless telecommunications system of FIG. 1, equal to the minimum between the maximum burst time period expected from said unpredicted interferers and a time period equal to twice the maximum coverage distance expected for communications from said unpredicted interferers divided by the speed of the moving conveyance 130.

According to a sixth embodiment, the first figure of merit $f(S_i)$ takes into account a usage ratio of each frequency present in the set $S_i$ of transmission channel resources. Indeed, in some countries, regulations impose that cumulated wireless transmission power per frequency in use be limited. A counter is associated with each frequency in order to count the quantity of time slots for which said frequency has been used in the wireless transmission system over a predefined time window. The first figure of merit $f(S_i)$ therefore aims at distributing the long-term usage of the frequencies as evenly as possible.

Combinations of embodiments among these first, second, third, fourth, fifth and sixth embodiments may be implemented to determine the first figure of merit $f(S_i)$.

In a following step S305, the processing device determines, for each set $S_i$ of transmission channel resources made available to perform said T transmissions, a second figure of merit g $(S_i)$ representative of robustness to interference that might be implied by predicted interferers located along the path 170.

According to a first embodiment, considering that the interference profile resulting from the step S310 provides a signal-to-interference plus noise ratio (SINR) information for each transmission channel resource available to perform said quantity T of transmissions, the second figure of merit $g(S_i)$ may be expressed as a sum of a third figure of merit $g_0(S_{i,j})$ determined for each transmission channel resource $S_{i,j}$ of the set $S_i$ of transmission channel resources. In this first embodiment, it is considered that each transmission channel resource $S_{i,j}$ is used to perform one transmission among the T transmissions and that each said transmission is a transmission of one copy of a same data set (e.g. a same data packet). The third figure of merit $g_0(S_{i,j})$ is representative of a probability of success of one said transmission via the transmission channel resource $S_{i,j}$. Thus the second figure of merit $g(S_i)$ is representative of a probability of success of the T transmissions. The second figure of merit $g(S_i)$ can be expressed as follows when a non-encoded BPSK (Binary Phase Shift Keying) modulation is implemented:

$$g(S_i) = \sum_j g_0(S_{i,j}) = \sum_j \log(1 - Q(\sqrt{SINR(S_{i,j})}))$$

wherein $SINR(S_{i,j})$ is the SINR information issued from the interference profile resulting from the step S310 for the transmission channel resource $S_{i,j}$ and Q( ) represents the Q-function providing a tail probability of a standard normal distribution.

According to a second embodiment, considering that the interference profile resulting from the step S310 provides an SINR information for each transmission channel resource available to perform said quantity T of transmissions, the second figure of merit $g(S_i)$ may be representative of transmission channel capacity. The second figure of merit $g(S_i)$ may be expressed as a sum of a fourth figure of merit $g_1(S_{i,j})$ determined for each transmission channel resource $S_{i,j}$ of the set $S_i$ of transmission channel resources. In this second embodiment, it is considered that each transmission channel resource $S_{i,j}$ is used to perform one transmission among the T transmissions and that each said transmission is a transmission of a distinct segment of the data set D after encoding with redundancy data. The fourth figure of merit $g_1(S_{i,j})$ is representative of a transmission channel capacity enabled by the transmission channel resource $S_{i,j}$. Thus the second figure of merit $g(S_i)$ is representative of channel capacity enabled by the set $S_i$ of transmission channel resources. The second figure of merit $g(S_i)$ can be expressed as follows:

$$g(S_i) = \sum_j g_1(S_{i,j}) = \sum_j \log_2(1 + SINR(S_{i,j}))$$

According to a third embodiment, considering that the interference profile resulting from the step S310 provides SINR information for each transmission channel resource made available to perform said quantity T of transmissions, the second figure of merit $g(S_i)$ may be representative of transmission performance, when implementing an error correcting code converting information bits into coded bits which are then converted into symbols of a discrete modulation, e.g. Quadrature Amplitude Modulation, before transmission. The second figure of merit $g(S_i)$ depends on the SINR information for all transmission channel resources of the set $S_i$ of transmission channel resources, and which may be expressed as follows:

$$g(S_i) = \left(1 - Q\sqrt{2^{\sum_j \log_2(1+SINR(S_{i,j}))} - 1}\right)^T$$

In a following step S306, the processing device determines transmission channel resources to be allocated for the T transmissions, by optimizing the first figure of merit under a QoS-target constraint applied to the second figure of merit. In other words, the processing device determines the set S among the sets $S_i$ of transmission channel resources which optimizes, e.g. maximizes, the first figure of merit f( ), while ensuring that the second figure of merit g( ) meets the QoS-target constraint.

According to a first embodiment, the processing device determines, for each set $S_i$ of transmission channel resources, a fifth figure of merit $h_0(S_i)$ to be maximized, such that:

$h_0(S_i)=f(S_i)+P(g(S_i)-QoS)$ wherein QoS is a parameter representative of the QoS-target constraint and P( ) is a penalty function favouring the sets $S_i$ of transmission channel resources that ensure $g(S_i)>QoS$. For instance, the penalty function is such that:

$P(x)=\min(x, 0)$

Consequently, the processing device selects, as the set S of transmission channel resources to be allocated to the T transmissions, the set $S_i$ of transmission channel resources that maximizes the fifth figure of merit $h_0($ ).

According to a second embodiment, the processing device selects, among all sets $S_i$ of transmission channel resources, the sets $S_k$ of transmission channel resources ensuring that $g(S)>QoS$ and determines, for each set $S_k$ of transmission channel resources, a sixth figure of merit $h_1(S_k)$ to be maximized. The sixth figure of merit $h_1(S_k)$ combines the first $f(S_k)$ and second $g(S_k)$ figures of merit determined for said set $S_k$, such that:

$h_1(S_k)=f(S_k)+B(g(S_k)-QoS)$ wherein B( ) is a barrier function such that:

$$\begin{cases} x > 0, \lim_{x \to 0+} B(x) = -\infty, & \frac{\partial B(x)}{\partial x} > 0 \\ x \leq 0, & B(x) = -\infty \end{cases}$$

which means that B(x>0) is strictly increasing with x. For instance, the barrier function B(x) is the logarithm, for positive values of x.

Consequently, the processing device selects, as the set S of transmission channel resources to be allocated to the T transmissions, the set $S_k$ of transmission channel resources that maximizes the sixth figure of merit $h_1($ ).

To summarize the two preceding embodiments, the processing device determines, for each set $S_i$ of transmission channel resources, another figure of merit combining the first and second figures of merit such that a penalty or barrier function is applied to a difference between the second figure of merit and the QoS-target constraint.

According to a third embodiment, the processing device determines, for each set $S_i$ of transmission channel resources, a seventh figure of merit $h_2(S_i)$ to be maximized, such that if $g(S_i) \le QoS$ for any set $S_i$ of transmission channel resources, then $h_2(S_i)=g(S_i)$ and otherwise $h_2(S_i)=f(S_i)$. In other words, when the second figure of merit $g(S_i)$ for any one of the sets $S_i$ of transmission channel resources shows that the QoS-target constraint cannot be met, the processing device selects the set S of transmission channel resources to be allocated to the T transmissions which optimizes the second figure of merit $g(\ )$ and otherwise selects the set S of transmission channel resources to be allocated to the T transmissions which optimizes the first figure of merit $f(\ )$.

Consequently, the processing device selects, as the set S of transmission channel resources to be allocated to the T transmissions, the set $S_i$ of transmission channel resources that maximizes the seventh figure of merit $h_2(\ )$.

According to a fourth embodiment, the processing device determines, for each set $S_i$ of transmission channel resources, an eighth figure of merit $h_3(S_i)$ to be maximized. The eighth figure of merit $h_3(S_i)$, which is an equivalent expression of the seventh figure of merit $h_2(S_i)$, combines the first $f(S_i)$ and second $g(S_i)$ figures of merit, such that:

$$h_3(S_i) = \frac{\max(g(S_i) - QoS; 0)}{g(S_i) - QoS} * f(S_i) + \min(g(S_i) - QoS; 0)$$

Consequently, the processing device selects, as the set S of transmission channel resources to be allocated to the T transmissions, the set $S_i$ of transmission channel resources that maximizes the eighth figure of merit $h_3(\ )$.

The definition of the eighth figure of merit $h_3(S_i)$ implies that $f(S_i)>0$. Either the first figure of merit is defined such that $f(S_i)>0$ or the processing device selects, among all sets $S_i$ of transmission channel resources, sets $S_m$ of transmission channel resources ensuring that $f(S_m)>0$ and then determines the eighth figure of merit $h_3(S_m)$ for the sets $S_m$ and selects the set S of transmission channel resources to be allocated to the T transmissions among said sets $S_m$.

According to a fifth embodiment, when the first figure of merit $f(S_i)$ has an integer output for any possible set $S_i$ of transmission channel resources, the processing device determines, for each set $S_i$ of transmission channel resources, a ninth figure of merit $h_4(S_i)$ to be maximized. When the second figure of merit $g(S_i)$ for any one of the sets $S_i$ of transmission channel resources shows that the QoS-target constraint cannot be met, the processing device selects the set S of transmission channel resources to be allocated to the T transmissions which optimizes the second figure of merit $g(\ )$ and otherwise selects the set S of transmission channel resources to be allocated to the T transmissions which optimizes the first figure of merit $f(\ )$ and which, for identical values of the first figure of merit $f(\ )$ optimizes the second figure of merit $g(\ )$. The ninth figure of merit $h_4(S_i)$ combines the first $f(S_i)$ and second $g(S_i)$ figures of merit, and may be expressed as follows:

$$\begin{cases} h_4(S_i) = H * f(S_i) + H' \\ H = \frac{\max(g(S_i) - QoS; 0)}{g(S_i) - QoS} \\ H' = \frac{g(S_i) - g_{inf}}{g_{sup} - g_{inf}} \end{cases}$$

wherein $g_{inf}$ is such that:

$$g_{inf} \le \min_{S_i}(g(S_i))$$

and wherein $g_{sup}$ is such that:

$$g_{sup} > \max_{S_i}(g(S_i))$$

It means that, whatever is the set $S_i$ of transmission channel resources, the following relationship is met:

$$g_{inf} \le g(S_i) < g_{sup}$$

Thus, the term H' belongs to $[0,1[$, which provides a decimal part to the ninth figure of merit $h_4(S_i)$, while the term H is an integer, which provides an integer part to the ninth figure of merit $h_4(S_i)$. Alternatively, when the second figure of merit $g(\ )$ is defined such that $0 \le g(S_i) < 1$, whatever is the set $S_i$ of transmission channel resources, then the term H' may be simply defined as $H'=g(S_i)$.

Consequently, the processing device selects, as the set S of transmission channel resources to be allocated to the T transmissions, the set $S_i$ of transmission channel resources that maximizes the eighth figure of merit $h_4(\ )$.

In a following step S307, the processing device allocates, for the communication between the first and second communication devices, the set S of transmission channel resources selected in the step S306.

In any one of the embodiments described here above, the processing device may consider all possible sets $S_i$ of transmission channel resources made available to perform said T transmissions (exhaustive approach). In a variant, the processing device may consider only a subset of all possible sets $S_i$ of transmission channel resources made available to perform said T transmissions, for instance by performing a random selection of the sets $S_i$ of transmission channel resources. In another variant, the processing device may consider sets $S_i$ of transmission channel resources for which a predefined amount of transmission channel resources are allocated beforehand, such as when implementing a sliding window in which a predefined amount of transmission channel resources are already allocated for the communication between the first and second communication devices and in which at least one other transmission channel resource remains to be allocated. Other heuristic approaches may be implemented instead. For instance, the processing device divides into groups the transmission channel resources made available to perform said T transmissions. Then, the processing device determines a tenth figure of merit $g_2(G_{n,j})$ for each transmission channel resource $G_{n,j}$ of each group $G_n$ of transmission channel resources. Then, the processing device associates with each group $G_n$ the tenth figure of merit $g_2(G_n)$ that is representative of the best performance among the tenth figures of merit $g_2(G_{n,j})$ determined for said group $G_n$. Then the processing device considers the sets $S_i$ of transmission channel resources as being aggregations of groups among said groups $G_n$ and the second figure of merit $g(S_i)$ is determined as being the sum of the tenth figures of merit $g_2(G_n)$ associated with each group $G_n$ forming the set $S_i$. The tenth figure of merit $g_2(\ )$ may be defined as already described with regard to the third figure of merit $g_0(\ )$ or to the fourth figure of merit $g_1(\ )$. Then the processing device optimizes the first figure of merit $f(S_i)$ under the QoS-target constraint applied to the second figure of merit $g(S_i)$ and selects the set S of transmission channel resources that provides the best performance among all sets $S_i$.

FIGS. 4A to 4G schematically represent configurations of the wireless telecommunications system of FIG. 1 for implementing the present invention. FIGS. 4A to 4G show the server 100, the communication device 131 located in the moving conveyance 130, as well as the AP 110. The processing device has reference 402 in FIGS. 4A to 4G. The configuration is duplicated for the other APs of the wireless telecommunications system.

Figure 4A:
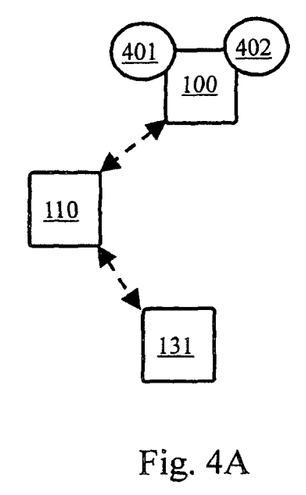
FIGS. 4A to 4G schematically represent configurations of the wireless telecommunications system for implementing the present invention.

FIG. 4A schematically represents a first configuration. In this configuration, the processing device 402 is located in, or connected to, the server 100. The fingerprint map 401 of interference is also located in, or connected to, the server 100. In this configuration, the server 100 receives, via the AP 110, from a communication device (such as the communication device 131) located in the concerned moving conveyance any data for updating the fingerprint map 401 of interference for what concerns downlink communications interference. The server 100 receives, from the AP 110, any data for updating the fingerprint map 401 of interference for what concerns uplink communications interference. The server 100 receives, via the AP 110, from the communication device 131 located in the moving conveyance 130 any data related to the second interference profile.

Figure 4B:
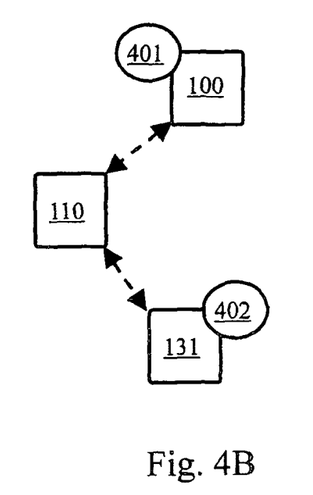

FIG. 4B schematically represents a second configuration. In this configuration, the processing device 402 is located in, or connected to, the communication device 131 located in the moving conveyance 130. The fingerprint map 401 of interference is located in, or connected to, the server 100. In this configuration, the server 100 receives, via the AP 110, from a communication device located in the concerned moving conveyance any data for updating the fingerprint map 401 for what concerns downlink communications interference. The server 100 receives, from the AP 110, any data for updating the fingerprint map 401 of interference for what concerns uplink communications interference. The communication device 131 located in the moving conveyance 130 receives, via the AP 110, from the server 100 any data related to the first interference profile. In a variant, the communication device 131 located in the moving conveyance 130 receives, directly from the AP 110, any data concerning uplink communications interference.

Alternatively, the update of the fingerprint map 401 of interference for what concerns downlink communications interference may be performed via data storage portable means, such as a USB (Universal Serial Bus) flash drive, that is firstly plugged to the communication device (such as the communication device 131 ) located in the concerned moving conveyance for transferring to the USB flash drive data stored in the database during the journey of the concerned moving conveyance on the path 170, and that is secondly plugged to the server 100 for transferring to the server 100 the data stored by the USB flash drive.

Figure 4C:
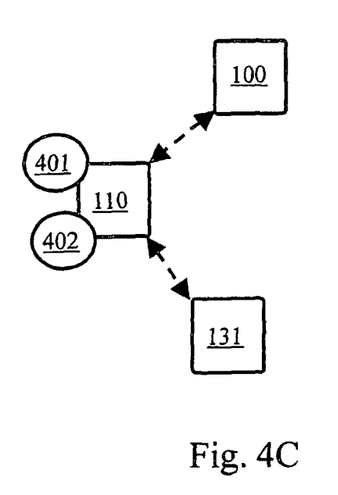

FIG. 4C schematically represents a third configuration. In this configuration, the processing device 402 is located in, or connected to, the AP 110. The fingerprint map 401 of interference is also located in, or connected to, the AP 110. In this configuration, the AP 110 receives from a communication device (such as the communication device 131) located in the concerned moving conveyance any data for updating the fingerprint map 401. The AP 110 receives from the communication device 131 located in the moving conveyance 130 any data related to the second interference profile.

Figure 4D:
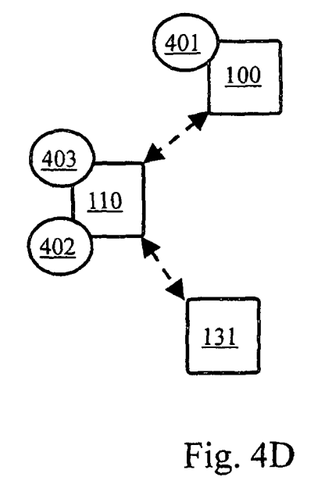

FIG. 4D schematically represents a fourth configuration. In this configuration, the processing device 402 is located in, or connected to, the AP 110. The fingerprint map 401 of interference is located in, or connected to, the server 100. A partial fingerprint map 403 of interference is located in, or connected to, the AP 110. This partial fingerprint map 403 of interference corresponds to a portion of the fingerprint map 401 for the part of the path 170 that is in the area managed by the AP 110. In this configuration, the server 100 receives, via the AP 110, from a communication device (such as the communication device 131) located in the concerned moving conveyance any data for updating the fingerprint map 401 for what concerns downlink communications interference. The AP 110 receives from the communication device 131 located in the moving conveyance 130 any data related to the second interference profile. The AP 110 receives from the server 100 any data for updating the partial fingerprint map 403 of interference.

Figure 4E:
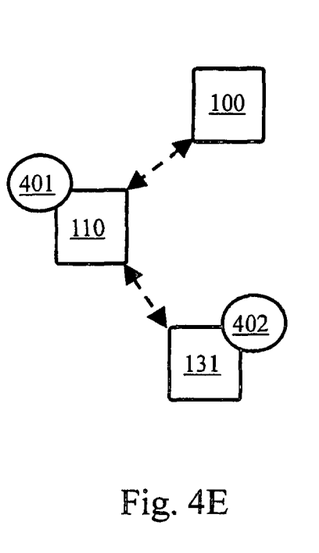

FIG. 4E schematically represents a fifth configuration. In this configuration, the processing device 402 is located in, or connected to, the communication device 131 located in the moving conveyance 130. The fingerprint map 401 of interference is located in, or connected to, the AP 110. In this configuration, the AP 110 receives from a communication device (such as the communication device 131) located in the concerned moving conveyance any data for updating the fingerprint map 401 for what concerns downlink communications interference. The communication device 131 located in the moving conveyance 130 receives from the AP 110 any data related to the first interference profile.

Figure 4F:
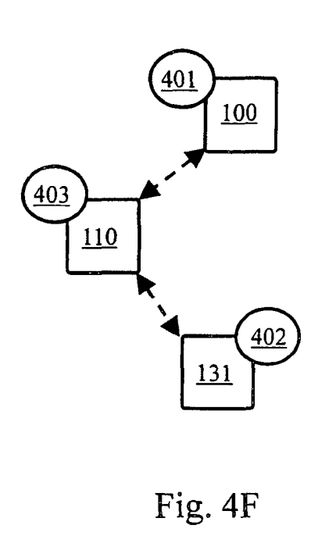

FIG. 4F schematically represents a sixth configuration. In this configuration, the processing device 402 is located in, or connected to, the communication device 131 located in the moving conveyance 130. The fingerprint map 401 of interference is located in, or connected to, the server 100. The partial fingerprint map 403 of interference is located in, or connected to, the AP 110. In this configuration, the server 100 receives, via the AP 110, from a communication device (such as the communication device 131) located in the concerned moving conveyance any data for updating the fingerprint map 401 for what concerns downlink communications interference. The AP 110 receives from the server 100 any data for updating the partial fingerprint map 403 of interference. The communication device 131 located in the moving conveyance 130 receives from the AP 110 any data related to the first interference profile.

Alternatively, the update of the fingerprint map 401 of interference for what concerns downlink communications interference may be performed via data storage portable means, such as a USB flash drive, that is firstly plugged to the communication device (such as the communication device 131) located in the concerned moving conveyance for transferring to the USB flash drive data stored in the database during the journey of the concerned moving conveyance on the path 170, and that is secondly plugged to the server 100 for transferring to the server 100 the data stored by the USB flash drive.

Figure 4G:
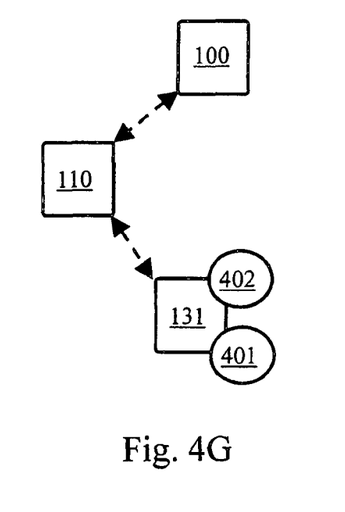

FIG. 4G schematically represents a seventh configuration. In this configuration, the processing device 402 is located in, or connected to, the communication device 131 located in the moving conveyance 130. The fingerprint map 401 of interference is also located in, or connected to, the communication device 131 located in the moving conveyance 130. The communication device 131 located in the moving conveyance 130 receives, from the AP 110, any data concerning uplink communications interference.

In a preferred embodiment, the configuration shown in FIG. 4D is implemented.

The invention claimed is:

1. A method for determining transmission channel resources to be allocated for a communication between a first communication device and a second communication device, the method being such that a processing device performs:
   obtaining an interference profile representative of interference with said communication implied by at least one predicted interferer, each predicted interferer being a device implying frequency-selective interference that has been detected beforehand;
   determining from the interference profile, for each set of transmission channel resources made available to perform said communication, a figure of merit, referred to as second figure of merit, representative of robustness to frequency-selective interference with said communication that is expected to be implied by predicted interferers;
   determining, for each set of transmission channel resources made available to perform said communication, a first figure of merit representative of robustness to frequency-selective interference with said communication that might be implied by unpredicted interferers, knowing beforehand to what extent said interference might impact said communication;
   selecting transmission channel resources that optimize the first figure of merit under a QoS-target constraint applied to the second figure of merit, the selected transmission channel resources being then the transmission channel resources to be allocated for the communication between the first communication device and the second communication device; and
   wherein the first figure of merit takes into account a minimum time distance between each couple of transmission channel resources of said set of transmission channel resources which use a same frequency.

2. The method according to claim 1, characterized in that, a frequency spectrum that can be used for performing said communication being divided into frequency bands having each a width equal to a predefined frequency band width covered by interference implied by said unpredicted interferers, the first figure of merit takes into account a quantity of distinct frequency bands among said frequency bands effectively used by said set of transmission channel resources.

3. The method according to claim 1, characterized in that the first figure of merit takes into account a minimum frequency distance between each transmission channel resource of said set of transmission channel resources and any other transmission channel resource of said set of transmission channel resources, and/or the first figure of merit takes into account an average frequency distance between successive transmission channel resources of said set of transmission channel resources, when ordering the transmission channel resources of said set of transmission channel resources according to frequency.

4. The method according to claim 1, characterized in that, a frequency spectrum that can be used for performing said communication being divided into frequency bands having each a width equal to a predefined frequency band width covered by interference implied by said unpredicted interferers, the first figure of merit takes into account a distribution among said frequency bands for said communication, when said communication requires more transmission channel resources than the quantity of frequency bands constituting the frequency spectrum.

5. The method according to claim 1, characterized in that the first figure of merit takes into account a usage ratio of each frequency present in said set of transmission channel resources.

6. The method according to claim 1, characterized in that, each transmission channel resource being used to perform one transmission among plural transmissions constituting said communication, each said transmission being a transmission of one copy of a same data set, the second figure of merit is a sum of a third figure merit determined for each transmission channel resource of said set of transmission channel resources, the third figure of merit being representative of a probability of success of one said transmission via said transmission channel resource.

7. The method according to claim 1, characterized in that, each transmission channel resource being used to perform a transmission of a distinct segment of a data set after encoding with redundancy data, the second figure of merit is a sum of a fourth figure merit determined for each transmission channel resource of said set of transmission channel resources, the fourth figure of merit being representative of a channel capacity enabled by said transmission channel resource.

8. The method according to claim 1, characterized in that, when implementing an error correcting code converting information bits into coded bits which are then converted into symbols of a discrete modulation before transmission in the scope of said communication, the second figure of merit is representative of a transmission performance via said set of transmission channel resources by taking into account signal-plus-interference to noise ratio information resulting from the interference profile for each transmission channel resource of said set of transmission channel resources.

9. The method according to claim 1, characterized in that the processing device performs:
   dividing into groups the transmission channel resources made available to perform said communication;
   determining another figure of merit for each transmission channel resource of each group;
   associating with each group said another figure of merit that is representative of the best performance among said another figures of merit determined for the transmission channel resources of said group;
   considering the sets of transmission channel resources made available to perform said communication as being aggregations of groups among said groups,
   and the second figure of merit is determined, for each set of transmission channel resources made available to perform said communication, as being the sum of said another figure of merit associated with each group forming said set of transmission channel resources.

10. The method according to claim 1, characterized in that, when the second figure of merit for any one of the sets of transmission channel resources made available to perform said communication shows that the QoS-target constraint cannot be met, the processing device selects the set of transmission channel resources to be allocated to said communication which optimizes the second figure of merit and otherwise selects the set of transmission channel resources to be allocated to said communication for which the first figure of merit is optimized, and for which, for identical values of the first figure of merit, the second figure of merit is optimized.

11. The method according to claim 1, characterized in that, for selecting the transmission channel resources that optimize the first figure of merit under a QoS-target constraint applied to the second figure of merit, the processing device determines, for each set of transmission channel resources made available to perform said communication, a fifth figure of merit combining the first and second figures of merit such that a penalty or barrier function is applied to a difference between the second figure of merit and the QoS-target constraint.

12. The method according to claim 1, characterized in that, when the second figure of merit for any one of the sets of transmission channel resources made available to perform said communication shows that the QoS-target constraint cannot be met, the processing device selects the set of transmission channel resources to be allocated to said communication which optimizes the second figure of merit and otherwise selects the set of transmission channel resources to be allocated to said communication which optimizes the first figure of merit.

13. The method according to claim 1, characterized in that, said communication being a communication between a communication device located in a moving conveyance performing a current journey on a path and an access point of a wireless telecommunications network located along the path, the interference profile is built from a first interference profile and/or a second interference profile, the first interference profile depending at least on interference measurements or estimations performed relatively to at least one communication device located in the moving conveyance or another moving conveyance during at least one preceding journey on the path, the second interference profile depending at least on interference measurements or estimations performed relatively to at least one communication device located in the moving conveyance during the current journey on the path.

14. A processing device for determining transmission channel resources to be allocated for a communication between a first communication device and a second communication device, the processing device comprising:
   a processor;
   a memory having a program stored therein which, when executed by the processor, performs:
   obtaining an interference profile representative of interference with said communication implied by at least one predicted interferer, each predicted interferer being a device implying frequency-selective interference that has been detected beforehand;
   determining from the interference profile, for each set of transmission channel resources made available to perform said communication, a figure of merit, referred to as second figure of merit, representative of robustness to frequency-selective interference with said communication that is expected to be implied by predicted interferers;
   determining, for each set of transmission channel resources made available to perform said communication, a first figure of merit representative of robustness to frequency-selective interference with said communication that might be implied by unpredicted interferers, knowing beforehand to what extent said interference might impact said communication;
   selecting transmission channel resources that optimize the first figure of merit under a QoS-target constraint applied to the second figure of merit, the selected transmission channel resources being then the transmission channel resources to be allocated for the communication between the first communication device and the second communication device; and
   wherein the first figure of merit takes into account a minimum time distance between each couple of transmission channel resources of said set of transmission channel resources which use a same frequency.

* * * * *